United States Patent
Graefe et al.

(10) Patent No.: US 8,165,931 B2
(45) Date of Patent: Apr. 24, 2012

(54) AUTOMATED PURCHASE ASSEMBLY CONVERSION PROCESS TO SUPPORT A DYNAMIC CONFIGURE-TO-ORDER PRODUCTION OPERATION

(75) Inventors: Matthias Graefe, Eppstein (DE); Lin Wang, Shenzhen (CN); Hao Xu, Shenzhen (CN); Matthew H. Zemke, Rochester, MN (US)

(73) Assignee: International Business Machines Corporation, Armonk, NY (US)

(\*) Notice: Subject to any disclaimer, the term of this patent is extended or adjusted under 35 U.S.C. 154(b) by 219 days.

(21) Appl. No.: 12/429,355

(22) Filed: Apr. 24, 2009

(65) Prior Publication Data

US 2010/0274686 A1    Oct. 28, 2010

(51) Int. Cl.
*A01K 5/02* (2006.01)
*G06Q 10/00* (2012.01)
*G06F 19/00* (2011.01)

(52) U.S. Cl. ............... 705/29; 705/28; 700/95; 700/99; 700/106

(58) Field of Classification Search ............... 705/28, 705/29
See application file for complete search history.

(56) References Cited

U.S. PATENT DOCUMENTS

| | | | |
|---|---|---|---|
| 5,307,261 A | 4/1994 | Maki et al. | |
| 5,311,424 A | 5/1994 | Mukherjee et al. | |
| 5,630,070 A | 5/1997 | Dietrich et al. | |
| 6,816,839 B1 | 11/2004 | Gung et al. | |
| 6,970,841 B1 * | 11/2005 | Cheng et al. | 705/28 |
| 7,038,677 B2 | 5/2006 | Callahan | |
| 7,840,441 B2 * | 11/2010 | Erickson et al. | 700/115 |
| 7,991,657 B2 * | 8/2011 | Kreifels et al. | 705/29 |
| 2002/0087438 A1 | 7/2002 | Kunieda et al. | |
| 2002/0154114 A1 * | 10/2002 | Christensen et al. | 345/419 |
| 2003/0046180 A1 * | 3/2003 | Chiu et al. | 705/26 |
| 2004/0128176 A1 | 7/2004 | Jordan et al. | |
| 2005/0171827 A1 | 8/2005 | Denton et al. | |
| 2006/0190291 A1 | 8/2006 | Erickson et al. | |
| 2006/0277086 A1 | 12/2006 | Ball et al. | |
| 2008/0120206 A1 * | 5/2008 | Weiler et al. | 705/28 |
| 2008/0201001 A1 | 8/2008 | Gerber et al. | |

OTHER PUBLICATIONS

Beth Bacheldor. (Jun. 2005). Ready, Set, Build. InformationWeek,(1045), 49,52-53. Retrieved Nov. 17, 2011, from ABI/INFORM Global. (Document ID: 864994421).*

* cited by examiner

*Primary Examiner* — Matthew Gart
*Assistant Examiner* — Scott Zare
(74) *Attorney, Agent, or Firm* — Yee & Associates, P.C.; Steven L. Bennett

(57) ABSTRACT

A computer implemented method, a tangible computer usable medium, and a data processing system allocate materials to an automated purchase assembly conversion process to support a dynamic configure-to-order production operation. A configure-to-order backlog order is analyzed to determine demand for a particular purchase assembly. If the demand for the particular purchase assembly can be filled with an on-hand purchase assembly in inventory, the on-hand purchase assembly in inventory is allocated to fill the demand. If the demand for the particular purchase assembly can not be filled with an on-hand purchase assembly in inventory, a determination is made as to whether the demand for the particular purchase assembly can be filled by reallocating other similar on-hand purchase assembly in inventory and on-hand individual parts. If the demand for the particular purchase assembly can be filled by reallocating other on-hand purchase assembly in inventory and on-hand individual parts, the on-hand purchase assembly in inventory and the on-hand individual parts are reallocated to fill the demand.

17 Claims, 10 Drawing Sheets

| EXCESS ASSEMBLY SUPPLY ||
|---|---|
| PART NUMBER | SUPPLY |
| 44D4176 | 0 |
| 44D4178 | 0 |
| 44D4180 | 3 |
| 44D4182 | 5 |

| TRANSLATED PARTS SUPPLY ||
|---|---|
| PART NUMBER | SUPPLY |
| *AAAAA* | 17 |
| 44D4047 | 19 |
| 44D4050 | 15 |
| 77P7342 | 10 |
| 77P7346 | 20 |

| CONVERSION FAMILY | | | |
|---|---|---|---|
| UNIQUE ID | ASSEMBLY PN | DIFFERENTIAL BILL-OF-MATERIAL | CONVERSION PRIORITY |
| AAAAA | 44D4176 <u>610</u> | 44D4050 (1), 77P7342 (1) <u>618</u> | |
| AAAAA | 44D4178 <u>612</u> | 44D4047 (1), 77P7342 (1) <u>620</u> | 2 |
| AAAAA | 44D4180 <u>614</u> | 44D4050 (1), 77P7346 (1) <u>622</u> | 1 |
| AAAAA | 44D4182 <u>616</u> | 44D4047 (1), 77P7346 (1) <u>624</u> | |

*FIG. 6*

| CONVERSION REQUIREMENT | | | |
|---|---|---|---|
| FROM ASSEMBLY <u>1010</u> | TO ASSEMBLY <u>1020</u> | QUANTITY <u>1030</u> | DATE <u>1040</u> |
| 44D4176 | 44D4178 | 20 | 0 |
| 44D4182 | 44D4180 | 5 | 1 |
| 44D4182 | 44D4178 | 15 | 2 |

| PRIORITY | ORDER 710 | PART NUMBER 712 | TRANSLATED PN 716 | CONVERSION COVERAGE 718 |
|---|---|---|---|---|
| | 1AB0001 | 44D4176 (5) | | |
| | 1AB0002 | 44D4178 (2) | | |

ORDER REQUIREMENTS FOR CONVERTIBLE PARTS

7b

| PRIORITY | ORDER 710 | PART NUMBER 712 | TRANSLATED PN 716 | CONVERSION COVERAGE 718 |
|---|---|---|---|---|
| 10 | 1AB0001 | 44D4176 (5) | *AAAAA* (5)<br>44D4050 (5)<br>77P7342 (5) | |
| 20 | 1AB0002 | 44D4178 (2) | *AAAAA* (2) | |

ORDER REQUIREMENTS FOR CONVERTIBLE PARTS

7c

| PRIORITY | ORDER 710 | PART NUMBER 712 | TRANSLATED PN 716 | CONVERSION COVERAGE 718 |
|---|---|---|---|---|
| 10 | 1AB0001 | 44D4176 (5) | *AAAAA* (5)<br>44D4050 (5)<br>77P7342 (5) | *AAAAA* (5)<br>44D4050 (5)<br>77P7342 (5) |
| 20 | 1AB0002 | 44D4178 (2) | *AAAAA* (2)<br>44D4047 (2)<br>77P7342 (2) | *AAAAA* (1)<br>44D4047 (1)<br>77P7342 (1) |

*FIG. 7*

AUTOMATED PURCHASE ASSEMBLY CONVERSION PROCESS TO SUPPORT A DYNAMIC CONFIGURE-TO-ORDER PRODUCTION OPERATION

BACKGROUND OF THE INVENTION

1. Field of the Invention

The present invention relates generally to a data processing system. More specifically, aspects of the present invention provide for a method, computer program product and data processing system for automating a purchase assembly conversion process to support a dynamic configure-to-order production operation.

2. Description of the Related Art

There is a rising tide of hardware personalization occurring in the supply chain in order to maximize the throughput of suppliers and minimize the costs to procure parts. At the same time, the supply chain has seen decreasing cycle times, as demanded by the customers, with an order book that consistently changes with spikes in demand, changes in order configurations, and product cancellations. The changes in the order books can occur nearly continuously throughout each production day. Generally, the higher the level of configuration offered for a product, the more variability and opportunity for changes in the order demand. Under current supply chain dynamics, there is little time to react to the demand changes in the standard, traditional fashion that is, ordering more parts.

In an effort to minimize the amount of assembly and test work to be added, companies structure and purchase several variations of the same assembly. These variations of the basic assembly system—sometimes called "vanilla" systems—become starting points in the company's order fulfillment process. However, in order to decrease production time and testing, the basic assembly systems include as much hardware as is practically possible.

Typically, a configure-to-order supply chain uses demand reports that drive the manufacturing team to personalize these low-level assemblies with specific parts. As the order demand shifts, the supply chain commonly reacts by purchasing additional low-level assemblies for personalization. The purchasing of additional low-level assemblies increases inventory-carrying costs and impacts cycle time. Generally, the time required to procure and pull additional low-level assemblies is longer than the time required to re-personalize an existing low-level assembly already in inventory.

While basic assembly systems can be procured at a lower assembly level, such a solution to the supply discrepancies is not optimal. Systems at a lower assembly level require additional downstream assembly and testing time by the manufacturer. Suppliers are not able to perform work and testing that might be possible in a higher-level assembly. Thus, the manufacturer must spend more time not only assembling the final product, but also in testing the product after assembly.

A materials replenishing plan or materials requirements plan (MRP) system is used to identify the low-level assemblies demand, as well as to identify the necessary quantity of each low-level assembly, based on current orders. A major challenge is that MRPs generally run weekly or, at best, nightly. In contrast, demand for a particular generic or personalized part can shift throughout the course of a single business day. Additionally, MRP output does not provide instruction on what or when to re-personalize certain inventory in order to make up for shortages in other inventory. This type of logical decision can only be made at the manufacturing assembly level in real time.

Unfortunately, order load often does not match the materials replenishing plan. Excesses of some of the basic assembly parts and shortages of others are inevitable. In order to satisfy customer orders on schedule, it becomes necessary to either procure more of the basic assemblies, or convert non-conforming in-inventory basic assemblies into conforming basic assemblies.

BRIEF SUMMARY OF THE INVENTION

According to one embodiment of the present invention, a computer implemented method, a tangible computer usable medium, and a data processing system are provided for allocating materials to an automated purchase assembly conversion process to support a dynamic configure-to-order production operation. A configure-to-order backlog order is analyzed to determine demand for a particular purchase assembly. If the demand for the particular purchase assembly can be filled with an on-hand purchase assembly in inventory, the on-hand purchase assembly in inventory is allocated to fill the demand. If the demand for the particular purchase assembly can not be filled with an on-hand purchase assembly in inventory, a determination is made as to whether the demand for the particular purchase assembly can be filled by reallocating on-hand purchase assembly in inventory and on-hand individual parts. If the demand for the particular purchase assembly can be filled by reallocating the on-hand purchase assembly in inventory and on-hand individual parts, the on-hand purchase assembly in inventory and the on-hand individual parts are reallocated to fill the demand.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a table illustrating conversion of purchased assemblies within a conversion family according to an illustrative embodiment;

FIGS. 7a-c are a series of order requirements data structures tracking convertible parts at various stages of allocation and reallocation according to an illustrative embodiment;

FIG. 10 is a conversion requirements data structure according to an illustrative embodiment;

DETAILED DESCRIPTION OF THE INVENTION

Figures 1, 8, 9:
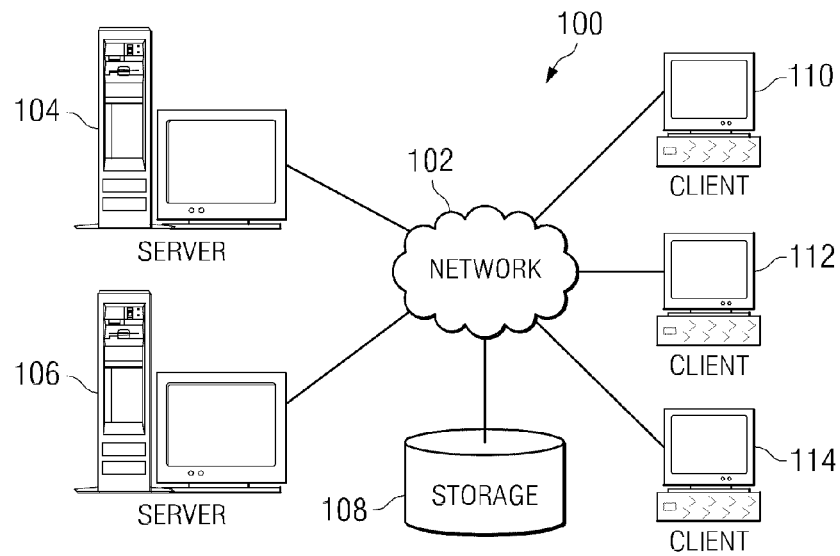
FIG. 1 is a pictorial representation of a network of data processing systems in which illustrative embodiments may be implemented.
FIG. 8 is an excess assembly supply data structure according to an illustrative embodiment.
FIG. 9 is a translated parts supply data structure according to an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
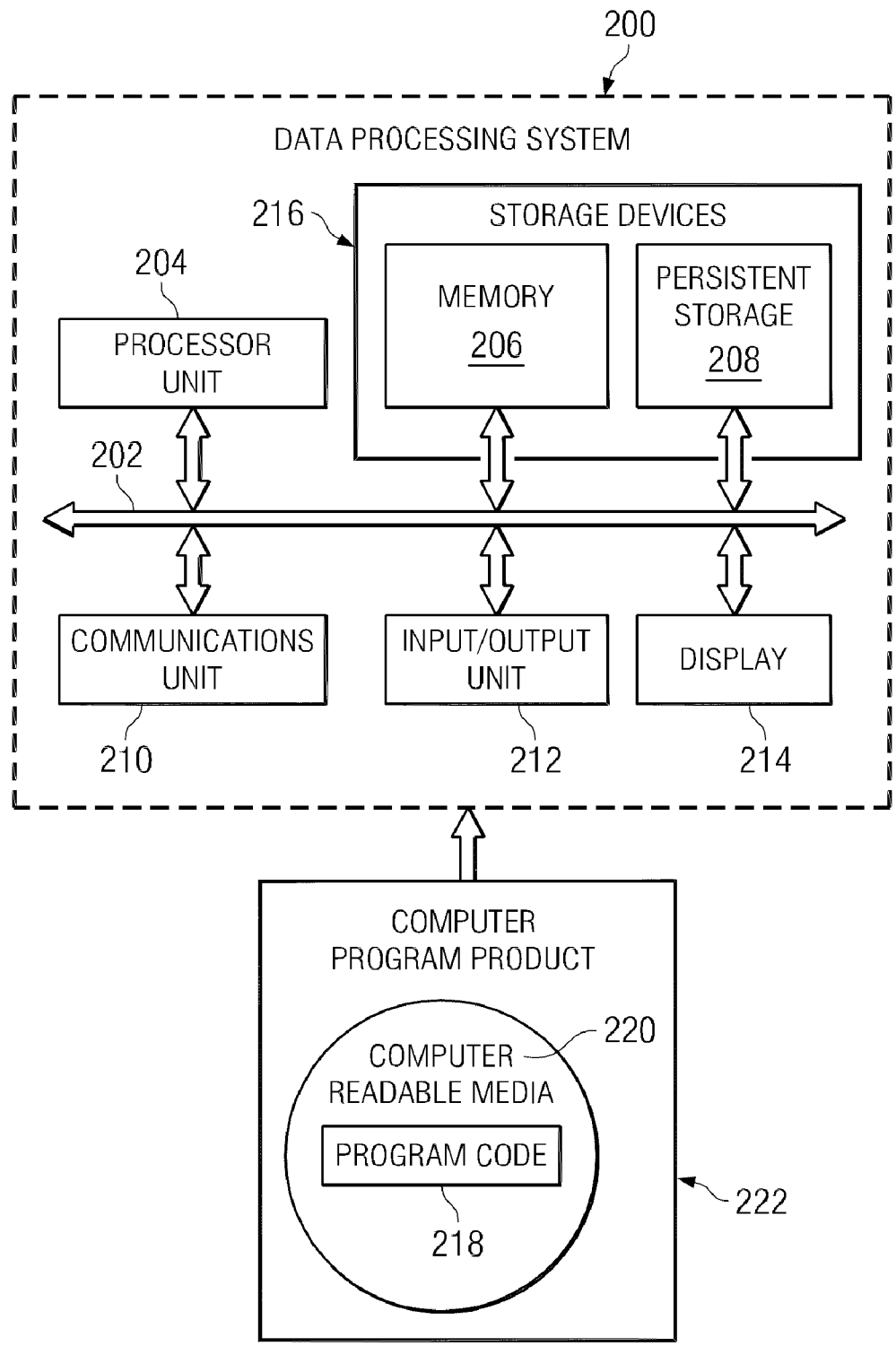
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information on either a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications using either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Exemplary embodiments provide a method and process to analyze in real-time the shifting demand for purchased assemblies, and the current manufacturing activity, to automatically generate allocation and reallocation of on-hand inventory, common assemblies and purchased assemblies directions for manufacturing. An exemplary embodiment reduces expedited inventory purchases and inventory carrying cost. Order fulfillment cycle time is also reduced. An exemplary embodiment provides for a self-adjusting inventory that matches order dynamics. The method is driven by a set of rules that ensures that process and inventory controls are maintained. Human error and inability are eliminated from the process of maintaining supply to order demand.

An exemplary embodiment provides an automated process that yields manufacturing allocation and reallocation directions. Within the automated process, potential conversions between purchased assemblies of a same conversion family in the manufacturing execution system are automatically identified. Purchased assemblies that are of the same conversion family and therefore have identical common assemblies are allowed to be reallocated into other purchased assemblies within their conversion family. Order backlog is automatically analyzed in order to determine net demand for purchased assemblies, common assemblies and other parts. The demand is then automatically categorized based on order priority within the manufacturing execution system, as well as being based upon started short orders versus un-started orders. Any on-hand purchased assemblies, common assemblies and inventory is automatically analyzed against current order demand to see inventory is capable of being allocated or reallocated to meet the demand. Then allocation and reallocation instructions are generated, manufacturing executes to those instructions, and the necessary inventory movement transactions are automatically executed. The automated process is controlled by run rules. Run rules are a set of table driven parameters that vary with the particular implementation and product being manufactured.

For example, a run rule could control the frequency to run the analysis of the demand for a particular part number. The frequency could be decided based on plant location and by time of day. Frequencies could be set to run the analysis once a day or once an hour, for example. The analysis could be triggered by load, that is, when an order backlog occurs that meets or exceeds a certain threshold size demand for a quantity of parts. Additionally, triggers could be established so that when a shortage of a part is detected, an analysis is triggered to run a certain number of hours later, or a certain number of hours after the initial search was conducted.

Other types of run rules may include alert mechanisms, such as automatic notification when work direction is incapable of being calculated, or when there are not enough generic parts or other parts to be allocated to meet the current demand. An alert may be sent when identifying specific serial numbers or part numbers that need to be reallocated. Run rules may also define allocation and reallocation mapping and include priority sorting. For example, purchased assembly A should be made from purchased assembly B first. If part B is not available, then purchased assembly A should be made from purchased assembly C. Purchased assembly A should never be made from purchased assembly D. If neither purchased assembly B nor purchased assembly C is available, then purchased assembly A should be made from common assembly Z. If common assembly Z is not available then generate a pull order for more of common assembly Z. Priority sorting means looking for purchased assembly B and purchased assembly C and excluding purchased assembly D before looking for common assembly Z. Order priority may also be taken into consideration. For example, output could be impacted based on satisfying "started short" orders first, higher dollar orders second, world trade third, and the rest last.

Figure 3:
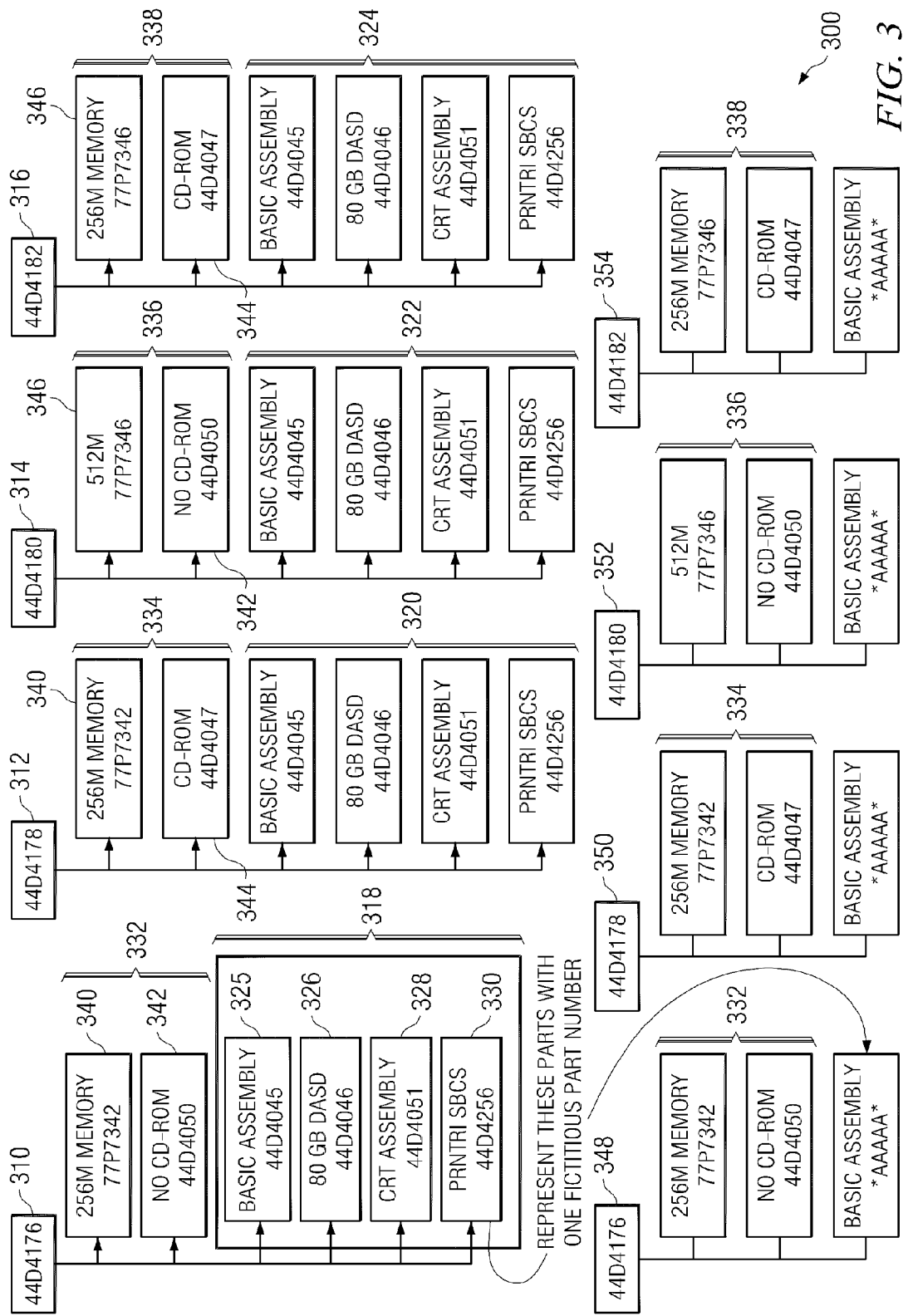
FIG. 3 is a simplified pictorial representation of a conversion family of data processing systems according to an illustrative embodiment.

Referring now to FIG. 3, a simplified pictorial representation of a conversion family of data processing systems is shown according to an illustrative embodiment. Each of expanded data processing system schematics 310-316 is representative of a data processing system, such data processing system 200 of FIG. 2.

Each of expanded data processing system schematics 310-316 is schematically represented by a common assembly and a bill of materials. Common assemblies 318-324 is a low level assembly that contains hardware parts common to each of the expanded data processing system schematics 310-316 within a particular conversion family. That is, each of common assemblies 318-324 includes, but is not limited to, a basic assembly 325, a direct access storage device 326, a CRT assembly 328, and a character encoding 330. Common assemblies 318-324 are part of a single conversion family. A conversion family is a group of related data processing system schematics, such as expanded data processing system schematics 310-316, that share a common assembly, such as common assemblies 318-324, but may have different bills of materials. A different conversion family may include a different common assembly that may have hardware components different from, or similar to the common assemblies 318-324.

Each of expanded data processing system schematics 310-316 is also schematically represented by one of bill of materials 332-338. Bill of materials 332-338 are those schematic components that are added to one of common assemblies 318-324 in order to create expanded data processing system schematics 310-316. A different one of bill of materials 332-338 can be generated for each order of the configure-to-order supply chain.

In the present illustrative embodiment, bill of materials 332 includes memory module 340 and CD ROM blank 342. Memory module 340 is a schematic representation of a memory module having 256 kilobytes of memory. CD ROM blank 342 is a schematic representation that a bezel is put in place of where a CD ROM could be included in expanded data processing system schematics 310.

In the present illustrative embodiment, bill of materials 334 includes memory module 340 and CD ROM module 344. Memory module 340 is a schematic representation of a memory module having 256 kilobytes of memory. CD ROM module 344 is a schematic representation that a CD ROM should be included in expanded data processing system schematics 312.

In the present illustrative embodiment, bill of materials 336 includes memory module 346 and CD ROM blank 342. Memory module 346 is a schematic representation of a memory module having 512 kilobytes of memory. CD ROM module 342 is a schematic representation that a CD ROM should be included in expanded data processing system schematics 314.

In the present illustrative embodiment, bill of materials 338 includes memory module 346 and CD ROM module 344. Memory module 346 is a schematic representation of a memory module having 512 kilobytes of memory. CD ROM module 344 is a schematic representation that a CD ROM should be included in expanded data processing system schematics 316.

Each of expanded data processing system schematics 310-316 can be schematically represented by one of contracted schematic 348-354. Contracted schematic 348-354 represent the data processing systems of expanded data processing system schematics 310-316. Contracted schematics 348-354 respectively include bill of materials 332-338. However, common assemblies 318-324 are represented as contracted assembly schematics 348-354. Because the hardware within a common assembly is consistent, the entire common assembly can be represented as a single part number within a part database. Similar to expanded data processing system schematics 310-316, contracted schematics 348-354 includes, but is not limited to a contracted representation of direct access storage device 326, CRT assembly 328, and character encoding 330.

Figure 4:
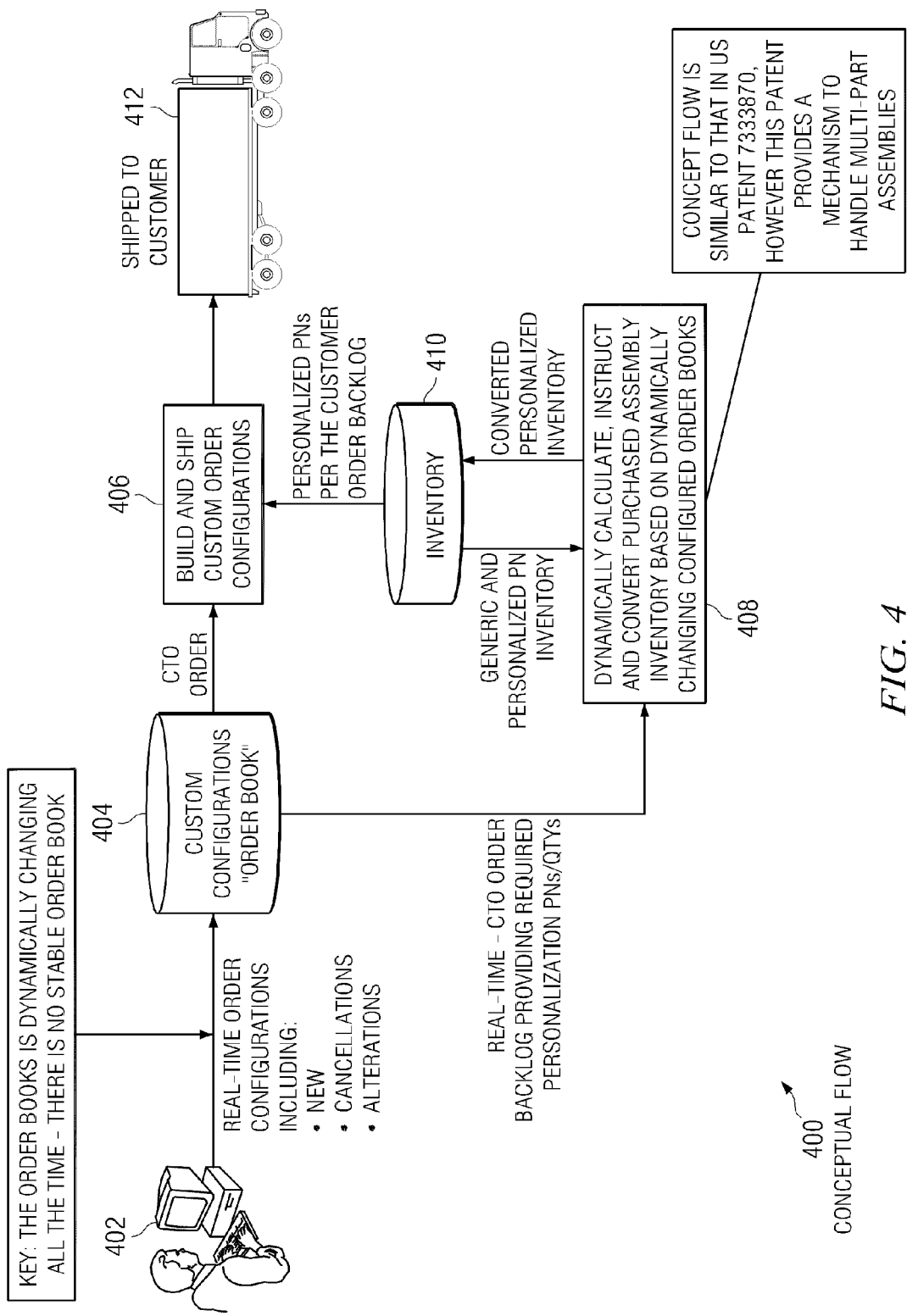
FIG. 4 is a diagram illustrating a high-level information flow for an automated purchase assembly conversion process in accordance with an exemplary embodiment.

FIG. 4 is a diagram illustrating a high-level information flow for an automated purchase assembly conversion process in accordance with an exemplary embodiment. The flow begins when user 402 inputs real-time order configurations, known as configure-to-order orders, including new orders, cancellations of orders, and alterations to orders. The custom configurations order book 404 is a backlog of various one-of-a-kind configure-to-order configurations. These configurations result in a set of parts for manufacturing which contain demands for various combinations of common assemblies and bills of materials. A set of parts comprises one or more common assemblies and bills of materials. A configure-to-order configuration is a specification for common assemblies and bills of materials assembled together. A demand is the required set of parts for a set of orders. Custom configurations order book 404 is under constant change as new information is received. Each time that new information is received into custom configurations order book 404, a determining component of build and ship process 406 determines if inventory 410 contains sufficient currently existing common assemblies and loose hardware parts to fulfill the demand. If build and ship process 406 determines that the demand can be fulfilled with the existing inventory, the manufacturer then builds the custom order configuration, pulling the needed current parts from inventory 410, and ships the finished goods to the customer (step 412).

If the demand cannot be fulfilled with the existing inventory, a configure-to-order order remains in the backlog of order book 404, which contains the required part numbers and quantities for the common assemblies and loose hardware parts. Existing inventory shortages for common assemblies and loose hardware parts are analyzed by an analyzing component in step 408 to determine if parts can be reallocated from existing common assemblies and loose hardware parts into order complying systems, thereby covering short parts for orders in order book 404. The analysis of parts within the common assemblies and loose hardware parts in step 408 runs as frequently as defined in the run rules, generally in real-time. During step 408 the reallocation requirements in order book 404, or demand, is compared to the on-hand inventory of inventory 410, as well as the individual parts contained within other on hand common assemblies. Run rules determine the allocation and reallocation instructions for manufacturing. The instruction is generated by a generating component in step 408. The generic and personalized part number inventory from inventory 410 is converted to the needed personalized inventory in step 408 and used in build and ship process 406 to build and ship each configure-to-order to the customer (step 412).

Figure 5:
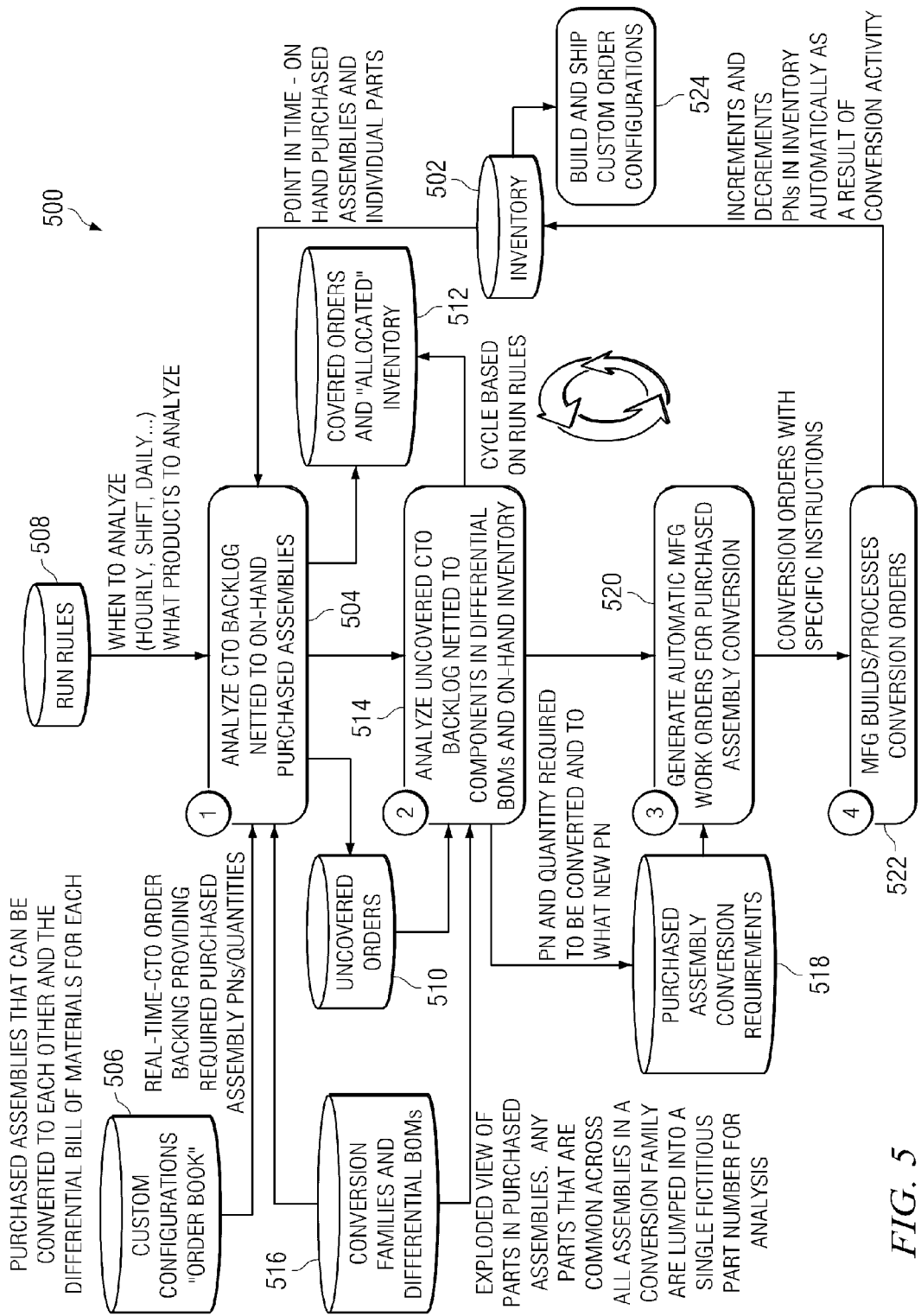
FIG. 5 is a block diagram illustrating an automated purchase assembly conversion process that supports a configure-to-order production operation in accordance with an exemplary embodiment.

FIG. 5 is a block diagram illustrating an automated purchase assembly conversion process that supports a configure-to-order production operation in accordance with an exemplary embodiment. FIG. 5 is more detailed look at step 408 of FIG. 4.

The operation begins by analyzing the configure-to-order backlog order, known as the demand, compared to the on-hand purchased assemblies in inventory 502 (step 504). The purchased assembly is an assembled combination of a specific common assembly and bill of materials into a specific data processing system, such as those data processing systems exemplified by one of expanded data processing system schematics 310-316 in FIG. 3. The operation gets the demand from custom configurations order book 506. The demand contains the required personalized part number and quantity needed to fill the order. The information regarding the on-hand common assemblies and loose hardware is gathered from inventory 502. Run rules 508 provide the rules for when to perform step 504. Any backlogged orders not covered by the on-hand purchased assemblies in inventory 502 are kept as uncovered orders 510. On-hand purchased assemblies that are used to fill the order are kept in covered orders and allocated inventory 512.

After existing on-hand purchased assemblies are allocated, the operation analyzes the uncovered configure-to-order backlog netted to components in differential bills of materials and on hand inventory (step 514). During step 514, the operation examines conversion families and differential bills of materials 516 to determine whether the reallocation requirements in custom configurations order book 506, can be filled with on-hand individual parts as well as parts contained within the bills of materials for other on-hand purchased assemblies.

The operation determines whether an on-hand purchased assembly exists in the same conversion family as the configure-to-order backlog order. A conversion family is a group of purchased assemblies that have identical common assemblies, but do not necessarily contain similar parts from an identical bill of materials. If an on-hand purchased assembly is found in the same conversion family as the configure-to-order backlog order, the process then determines whether parts can be allocated from other on-hand individual parts as well as parts contained within the bills of materials for other on-hand purchased assemblies. If a purchased assembly in the same conversion family as the configure-to-order backlog order is not found to be on-hand, the order is delayed until an additional purchased assembly in the same conversion family is found, which can occur, for example, upon the purchase of additional common assemblies.

On-hand purchased assemblies identical to the configure-to-order backlog order have been previously allocated in step 504. Therefore, as of step 514, no purchased assembly identical configure-to-order backlog order exists in unallocated inventory. In order to fill an additional configure-to-order backlog order, a purchased assembly in a same conversion family as the configure-to-order backlog order can be reconfigured so that the parts in the reconfigured system will match the bill of materials necessary for the order. The process therefore searches bills of materials of unallocated on-hand purchased assemblies and on-hand individual parts. Parts from on-hand purchased assemblies and on-hand individual parts can be reallocated to convert a purchased assembly in a same conversion family as the configure-to-order backlog into a system matching one of the configure-to-order backlog ordered systems. On-hand purchased assemblies, parts reallocated from on-hand purchased assemblies, and on-hand individual parts that are used to fill the order are kept in covered orders and allocated inventory 512. On-hand purchased assemblies and parts reallocated from on-hand purchased assemblies are also kept in purchased assembly conversion requirements 518, and on-hand individual parts kept in inventory 502, with both sources of information used so that a work order can be generated.

The operation generates automatic manufacturing work orders for purchased assembly conversion (step 520). The automatic manufacturing work orders for purchased assembly conversion include part numbers for each of the on-hand purchased assemblies allocated in step 504. The automatic manufacturing work orders for purchased assembly conversion also include part numbers for each of the on-hand purchased assemblies, parts reallocated from on-hand purchased assemblies, and on-hand individual parts reallocated in step 514. The automatic manufacturing work orders for purchased assembly conversion therefore provide a reference guide from which systems and parts needed to fill the order can be located.

The personalization orders with specification instructions regarding the allocation and reallocation of the parts are sent to manufacturing personnel, who process the allocation orders and build, either allocating or reallocating, the necessary parts (step 512). The allocated parts are then placed into inventory 502. The actual customer configure-to-order orders that require building and shipping are sent from order book 506 to build and ship customer configurations 524. This causes the allocated parts to be pulled from inventory 502 at the appropriate times to build and ship the configure-to-order customer orders from Order Book 506. While allocation rules and reallocation rules are shown as separate databases, such as conversion families and differential bills of materials 516 and purchased assembly conversion requirements 518, it is possible for both sets of rules to be part of one database, depending on the particular implementation. Furthermore, the allocation rules and reallocation rules may also be contained within run rules 508, depending on the specific implementation.

Referring now to FIG. 6, a table illustrating conversion of purchased assemblies within a conversion family is shown according to an illustrative embodiment. Conversion family table 600 illustrates a group of purchased assemblies that have identical common assemblies, but do not necessarily contain similar parts in their respective bill of materials.

Unique IDs 602-608 are the unique part numbers assigned to common assemblies, such as those common assemblies indicated in common assemblies 318-324 and contracted schematics 348-354 of FIG. 3. For a given conversion family, each Unique IDs 602-608 will be identical. Unique IDs 602-608 can therefore be used to distinguish between different conversion families.

Assembly Part Numbers 610-616 are the unique part numbers assigned to a purchased assembly, such as one of expanded data processing system schematics 310-316 and contracted schematics 348-354. Assembly Part Numbers 610-616 therefore represent a common assembly and a bill of materials. A demand within a certain order identifies a system based on the assigned Assembly Part Numbers 610-616.

Differential Bill-of Materials 618-624 are bill of materials 332-338 of FIG. 3. Differential Bill-of Materials 618-624 are those parts that are added to a common assembly represented by Unique IDs 602-608 in order to create the systems represented by Assembly Part Numbers 610-616.

Conversion family table 600 also indicates conversion priorities 626-632. Conversion priorities 626-632 is a hierarchical sequence of assembly consumption when a conversion is required between the various purchased assemblies of a certain conversion family. Purchased assemblies with a higher conversion priority are preferentially chosen to be converted into different purchased assemblies within the same conversion family. Thus in this illustrative embodiment, assembly PN 44D4180 would be preferred over PN 44D4178 for conversion into a different purchased assembly within the same conversion family.

Referring now to FIGS. 7*a-c*, a series of order requirements data structures tracking convertible parts at various stages of allocation and reallocation is shown according to an illustrative embodiment. The order requirements data structure 700 is shown at various stages of the automated purchase assembly conversion process of FIG. 5.

Referring now Specifically to FIG. 7*a*, a configure-to-order backlog order is shown as retrieved from the custom configurations "order book" prior to any allocation or reallocation of parts. Order Number 710 tracks a demand in the backlog order for a particular configure-to-order order. Part Number 712 is an indication of a particular schematic for the demanded data processing system, which can be contracted schematic 348-354 of FIG. 3. In this illustrative embodiment, part number 712 indicates a demand for five of part number 44D4176, and 2 of part number 44D4178. Part number 44D4176 is data processing systems 310 of FIG. 3. Part number 44D4178 is data processing systems 312 of FIG. 3

Referring now Specifically to FIG. 7*b*, a configure-to-order backlog order is shown, expanding the data processing systems 310-316. The allocation and reallocation process has filled in translated part number 716. Translated part number 716 is an expanded schematic of part number 712. Translated part number 716 can be, for example, contracted schematics 348-354 of FIG. 3. Translated part number 716 includes a part number for the common assembly and for each of the parts in the bill of materials that together comprise the data processing system represented by part number 712. When part number for the common assembly and for each of the parts in the bill of materials are known, the allocation and reallocation process can readily determine if on-hand parts and purchased assemblies can be allocated and reallocated to fill the parts and common assemblies needed to fill the order.

Referring now to FIG. 7*c*, a configure-to-order backlog order is shown, showing the actual on-hand part coverage for the ordered data processing systems. The allocation and reallocation process has filled in conversion coverage 718. Conversion coverage 718 is an on-hand inventory accounting and allocation for each of the parts listed in translated part number 716. Conversion coverage 718 does not indicate where the necessary parts for completing the order are located; but only that the parts necessary for completing the order are contained in on-hand inventory. Based on Conversion coverage 718, the allocation and reallocation process can determine whether to reserve parts in inventory and issue a clear to build for completion of the order, or whether to allocate the parts to other orders.

Referring now to FIG. 8, an excess assembly supply data structure is shown according to an illustrative embodiment. Excess assembly supply data structure 800 tracks on-hand purchased assemblies, which are identified as a result of step 504 in FIG. 5.

Excess assembly supply data structure 800 includes part numbers 810, and supplies 820. Part numbers 810 are the unique part numbers assigned to an on-hand purchased assembly, which can be one of expanded data processing system schematics 310-316 and contracted schematics 348-354. Supplies 820 is the specific quantity of unallocated purchased assemblies of the particular part numbers 810 that are currently in on-hand inventory.

Referring now to FIG. 9, a translated parts supply data structure is shown according to an illustrative embodiment. Translated parts supply data structure 900 tracks on-hand supply that could be harvested from on-hand purchased assemblies, plus the equivalent loose parts supply.

Translated parts supply data structure 900 includes part numbers 910, and supplies 920. Part numbers 910 are the unique part numbers assigned to an on-hand common assemblies as well as on-hand parts from the bills of materials for on-hand purchased assemblies and on-hand parts not incorporated into a purchased assembly. Supplies 920 is the specific quantity of unallocated common assemblies and unallocated parts, regardless of whether the parts are currently incorporated into a purchased assembly, of the particular part numbers 910 that are currently in on-hand inventory.

Referring now to FIG. 10, a conversion requirements data structure is shown according to an illustrative embodiment. Conversion requirements data structure 1000 tracks on-hand purchased assemblies and the conversion of those purchased assemblies into other purchased assemblies of the same conversion family.

From Assembly 1010 is a listing of the unique part numbers assigned to an on-hand purchased assembly that is available for conversion to a different purchased assembly within the conversion family. From Assembly 1010 essentially is a direction to manufacturing to pull a purchased assembly of the indicated part number, and convert that purchased assembly into a different system.

To Assembly 1020 is a listing of the unique part numbers for a data processing system to which an on-hand purchased assembly should be converted. To Assembly 1020 essentially is a direction to manufacturing to convert a pulled purchased assembly, such as From Assembly 1010, into the purchased assembly indicated by the unique part number of To Assembly 1020.

Quantity 1030 is an indication of the specific quantity of purchased assemblies of From Assembly 1010 that should be converted to purchased assemblies of To Assembly 1020. Quantity 1030 essentially is a direction to manufacturing to convert the specified quantity of how many purchased assemblies of From Assembly 1010 should be converted into purchased assemblies of To Assembly 1020.

Date 1040 is a target date by which the conversion from From Assembly 1010 to To Assembly 1020 should be completed.

Figure 11A:
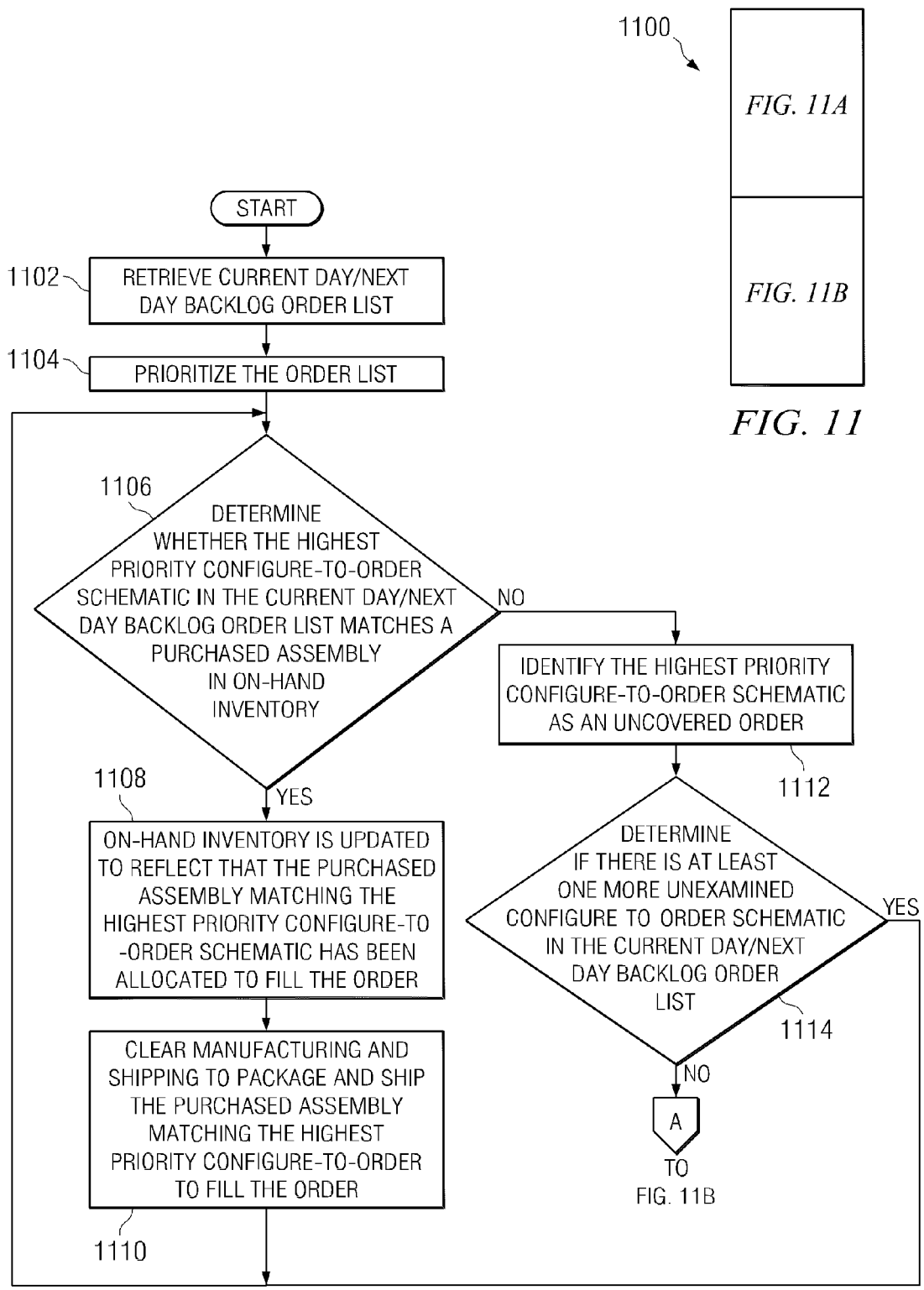
FIG. 11 is a flowchart of the integrated supply chain according to an illustrative embodiment.
Figure 11B:
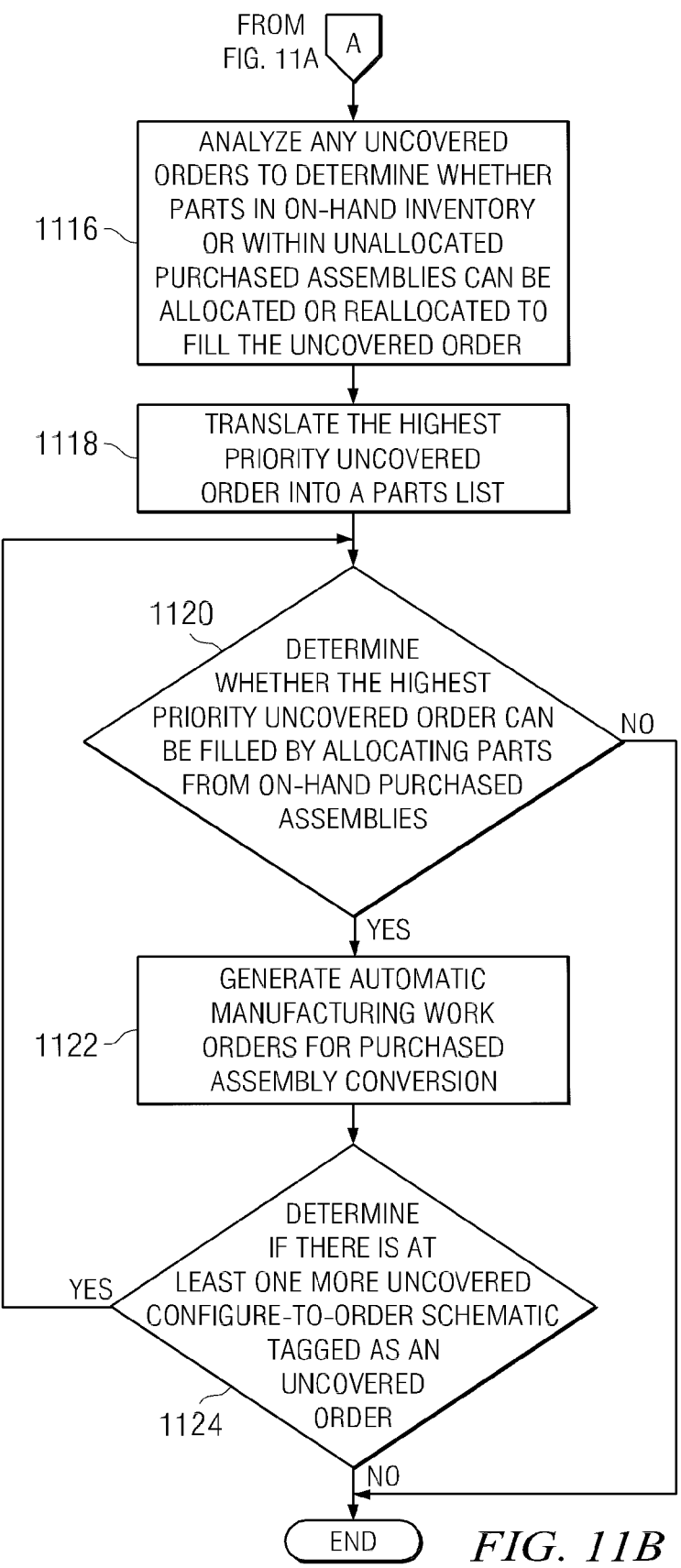

Referring now to FIG. 11, a flowchart of the integrated supply chain is shown according to an illustrative embodiment. Process 1100 is a process flow of the high-level automated purchase assembly conversion system of FIG. 5. Process 1100 is a software process, executing on a software component of a data processing system, such as data processing system 200 of FIG. 2.

Process 1100 begins by retrieving the current day/next day backlog order list (step 1102). The current day/next day backlog order list is retrieved from a custom configurations order book, such as custom configurations order book 404 of FIG. 4. The current day/next day backlog order list is a backlog of various one-of-a-kind configure-to-order configurations. Retrieval of the current day/next day backlog order list result in a set of parts for manufacturing which contain demands for various combinations of common assemblies and bills of materials.

Process 1100 then prioritizes the order list (step 1104). The current day/next day backlog order list can be, for example, prioritized based on order priority within the manufacturing execution system, as well as being based upon started short orders versus un-started orders.

Process 1100 then determines whether the highest priority configure-to-order schematic in the current day/next day backlog order list matches a purchased assembly in on-hand inventory (step 1106). If the highest priority configure-to-order schematic in the current day/next day backlog order list matches a purchased assembly in on-hand inventory ("yes" at step 1106), then the order for the highest priority configure-to-order schematic can be filled. On-hand inventory is updated to reflect that the purchased assembly matching the highest priority configure-to-order schematic has been allocated to fill the order (step 1108). Process 1100 then clears manufacturing and shipping to package and ship the purchased assembly matching the highest priority configure-to-order in order to fill the order step (1110). Process 1100 then iterates back to step 1106 to attempt to fill a next highest priority configure-to-order schematic.

Returning now to step 1106, if the highest priority configure-to-order schematic in the current day/next day backlog order list does not match a purchased assembly in on-hand inventory ("no" at step 1106), then process 1100 identifies the highest priority configure-to-order schematic as an uncovered order (step 1112). To prevent excessive conversion of purchased assemblies among a conversion family, process 1100 can delay filling any uncovered orders until after purchased assembly matching one of the configure-to-order schematic in the current day/next day backlog order list have been allocated.

Process 1100 then determines if there is at least one more unexamined configure-to-order schematic in the current day/next day backlog order list (step 1114). If Process 1100 determines that there is at least one more unexamined configure-to-order schematic in the current day/next day backlog order list ("yes" at step 1114), process 1100 iterates back to step 1106 to attempt to fill a next highest priority configure-to-order schematic.

Returning now to step 1114, if process 1100 determines that there is not at least one more unexamined configure-to-order schematic in the current day/next day backlog order list iterates back to step 1106 to attempt to fill a next highest priority configure-to-order schematic ("no" at step 1114), process 1100 then analyzes any uncovered orders to determine whether parts in on-hand inventory or within unallocated purchased assemblies can be allocated or reallocated to fill the uncovered order (step 1116). Process 1100 translates the highest priority uncovered order into a parts list (step 1118). The parts list can be translated part number 716 of FIG. 7. The translated parts list includes a part number for the common assembly and for each of the parts in the bill of materials that together comprise the purchased assembly of the uncovered order.

Process 1100 then determines whether the highest priority uncovered order can be filled by allocating parts from on-hand inventory and on-hand purchased assemblies (step 1120). In order to fill the current day/next day backlog order, a purchased assembly in a same conversion family can be reconfigured so that the parts in the reconfigured system will match the bill of materials for the schematic of the highest priority uncovered order. The process therefore searches the schematic bills of materials of unallocated on-hand purchased assemblies and on-hand individual parts. Parts from on-hand purchased assemblies and on-hand individual parts can be reallocated to convert a purchased assembly in a same conversion family as the configure-to-order backlog into a system matching one of the configure-to-order backlog ordered systems. Determination of uncovered order reallocation can be recorded as conversion coverage 718 of FIG. 7. Based on the conversion coverage, process 1100 can determine whether to reserve parts in inventory and issue a clear to build for completion of the order, or whether to allocate the parts to other orders.

Responsive to determining that the highest priority uncovered order can be filled by allocating parts from on-hand inventory and on-hand purchased assemblies ("yes" at step 1120), process 1100 generates automatic manufacturing work orders for purchased assembly conversion (step 1122). The automatic manufacturing work orders for purchased assembly conversion include part numbers for each of the on-hand purchased assemblies allocated as well as the part numbers for each of the on-hand purchased assemblies, parts reallocated from on-hand purchased assemblies, and reallocated on-hand individual parts. The automatic manufacturing work orders for purchased assembly conversion therefore provide a reference guide from which systems and parts needed to fill the order can be located.

Process 1100 then determines if there is at least one more uncovered configure-to-order schematic tagged as an uncovered order (step 1124). If Process 1100 determines that there is at least one more uncovered configure-to-order schematic tagged as an uncovered order ("yes" at step 1124), process 1100 iterates back to step 1120 to attempt to allocate parts for a next highest priority uncovered configure-to-order schematic.

Returning now to step 1124, if Process 1100 determines that there is not at least one more uncovered configure-to-order schematic tagged as an uncovered order ("no" at step 1124), process 1100 terminates.

Figure 12:
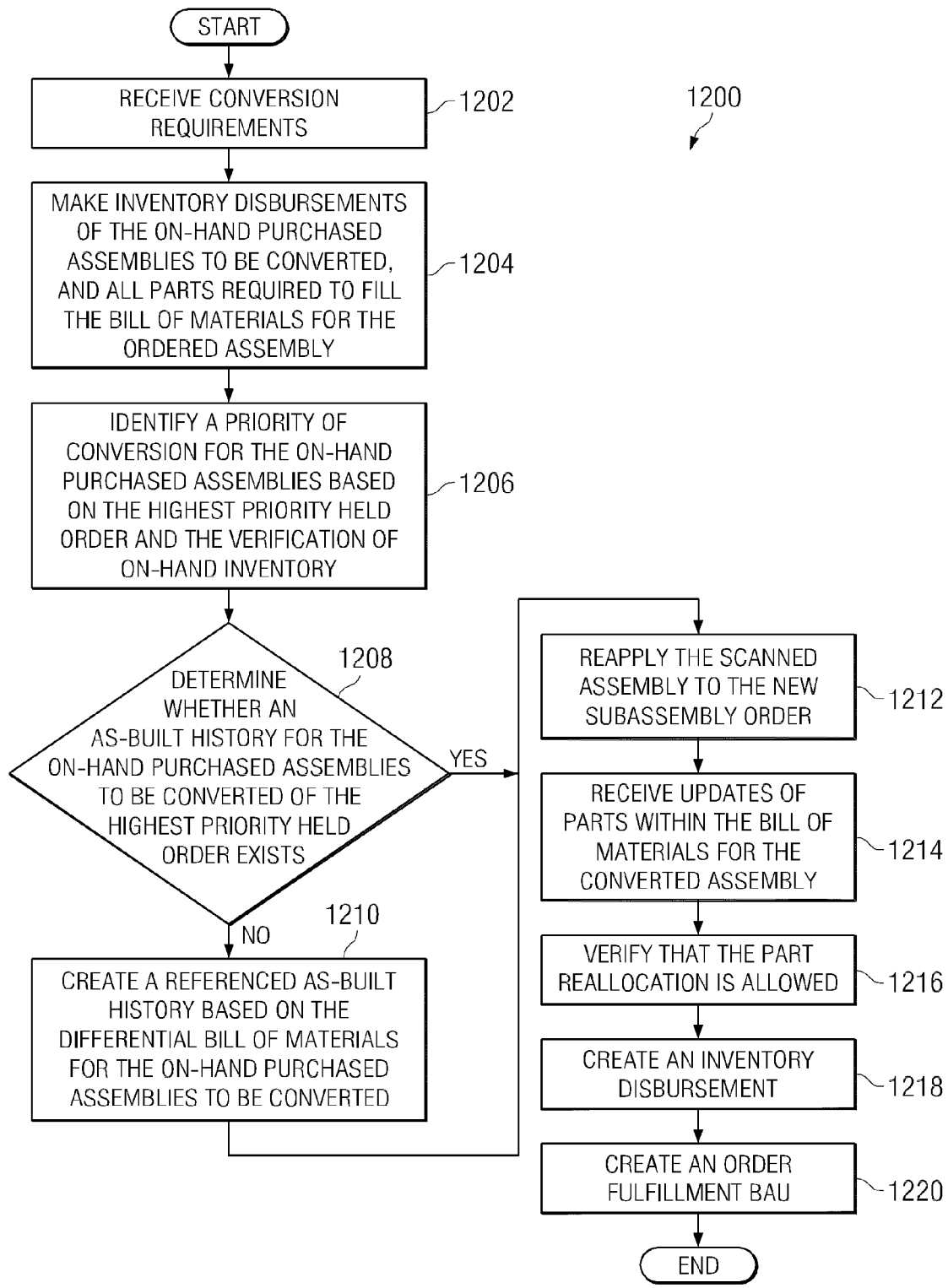
FIG. 12 is a flowchart for the conversion execution of purchased assemblies within a conversion family according to an illustrative embodiment.

Referring now to FIG. 12, a flowchart for the conversion execution of purchased assemblies within a conversion family is shown according to an illustrative embodiment.

Process 1200 begins by receiving conversion requirements (step 1202). The conversion requirements are contained in a conversion requirements data structure, such as conversion requirements data structure 1000 of FIG. 10. The conversion requirements is a listing of the on-hand purchased assemblies and instructions for the required conversion of those purchased assemblies into other purchased assemblies of the same conversion family.

The conversion requirements include a listing of the unique part numbers assigned to an on-hand purchased assembly that is available for conversion to a different purchased assembly within the conversion family, such as From Assembly 1010 of FIG. 10. The conversion requirements include a listing of the unique part numbers for a data processing system to which an on-hand purchased assembly should be converted, such as To Assembly 1020 of FIG. 10. The conversion requirements include an indication of the specific quantity of purchased assemblies that should be converted. This indication can be Quantity 1030 of FIG. 10.

Responsive to receiving the conversion requirements, process 1200 makes inventory disbursements of the on-hand purchased assemblies to be converted, and any parts required to fill the bill of materials for the ordered assembly (step 1204). The purchased assemblies to be converted, as well as the allocated parts required to complete the conversion are tagged so that manufacturing can retrieve the purchased assemblies and allocated on-hand parts for conversion into the ordered purchased assemblies.

Once tagged inventory is transferred to manufacturing for conversion, process 1200 identifies a priority of conversion for the on-hand purchased assemblies based on the highest priority held order and the verification of on-hand inventory (step 1206). The priority of conversion is a hierarchical ranking of which orders should be prioritized, and therefore, which conversions should be preferentially performed.

Once a priority of conversion is determined, process 1200 determines whether an as-built history for the on-hand purchased assemblies to be converted of the highest priority held order exists (step 1208). The on-hand purchased assemblies to be converted are identified to the process, such as for example, by input by the manufacturing operator. Any as-built history of the on-hand purchased assemblies to be converted is retrieved. The as-built history is a record of the hardware and software parts, ports, MAC addresses and other information that may be relevant to the configuration of the on-hand purchased assembly to be converted. If an as-built history for the on-hand purchased assemblies to be converted does not exist ("no" at step 1208), process 1200 creates a reference as-built history based on the differential bill of materials for the on-hand purchased assemblies to be converted (step 1210). Process 1200 therefore retrieves the information that would normally be found in the as-built history, including, for example, but not limited to, the hardware and software parts, installed in the on-hand purchased assemblies to be converted, port information, and MAC addresses. If an as-built history for the on-hand purchased assemblies to be converted does exist ("yes" at step 1208), process 1200 proceeds to step 1212.

Process 1200 reapplies the scanned assembly to the new subassembly order (step 1212). There is a work order associated with each assembly, both From and To. Reapply involves the software application copying the installed part information from the From Assembly work order to the To Assembly work order, rather than having a manufacturing operator logistically uninstall all parts in the From Assembly and logistically reinstall in the To Assembly. After the reapply there are still parts to add and remove.

Process 1200 then receives updates of parts within the bill of materials for the converted assembly (step 1214). As parts are added to, or removed from the purchased assembly to be converted, the manufacturing operator scans those parts. Parts added to the purchased assembly to be converted are removed from on-hand inventory and added to the bill of materials for the purchased assembly. Parts removed from the purchased assembly to be converted are removed from the bill of materials for the purchased assembly and added to on-hand inventory. For any parts removed from the purchased assembly that do not match the as-built data, process 1200 verifies that the part reallocation is allowed (step 1216). In the case where an error or difference between the logistic records and the actual installed part, when the installed part is removed it is validated to be an allowed substitution.

Process 1200 then creates an inventory disbursement (step 1218). The inventory disbursement is the location at which parts removed from the purchased assembly will be stored as on-hand inventory. The inventory disbursement can also factor whether parts removed from the purchased assembly will be reallocated to other purchased assemblies in the same order. Reallocating parts removed from the purchased assembly to other purchased assemblies in the same order prevents repetitious stocking and retrieval of on-hand inventory. Once conversion is completed, the manufacturing operator can return any unused parts removed from the purchased assemblies to on-hand inventory. Those parts are then available for future conversions.

Process 1200 then decrements inventory of the From Assembly, and increments inventory of the To Assembly (step 1220), with the process terminating thereafter. The From Assembly has been converted to the To Assembly. Therefore, inventory is updated to reflect that one less From Assembly and one more To Assembly are now present in inventory.

Exemplary embodiments provide a method and process to analyze in real-time the shifting demand for purchased assemblies, and the current manufacturing activity, to generate automatic allocation and reallocation of on-hand inventory, common assemblies and purchased assemblies directions for manufacturing. An exemplary embodiment reduces expedited inventory purchases and inventory carrying cost. Order fulfillment cycle time is also reduced. An exemplary embodiment provides for a self-adjusting inventory that matches order dynamics. The method is driven by a set of rules that ensures that process and inventory controls are maintained. Human error and inability are eliminated from the process of maintaining supply to order demand.

An exemplary embodiment provides an automated process that yields manufacturing allocation and reallocation directions. Within the automated process, potential conversions between purchased assemblies of a same conversion family in the manufacturing execution system are automatically identified. Purchased assemblies that are of the same conversion family and therefore have identical common assemblies are allowed to be reallocated into other purchased assemblies within their conversion family. Order backlog is automatically analyzed in order to determine net demand for purchased assemblies, common assemblies and other parts. The demand is then automatically categorized based on order priority within the manufacturing execution system, as well as being based upon started short orders versus un-started orders. Any on-hand purchased assemblies, common assemblies and inventory is automatically analyzed against current order demand to see inventory is capable of being allocated or reallocated to meet the demand. Then allocation and reallocation instructions are generated, manufacturing executes to those instructions, and the necessary inventory movement transactions are automatically executed. The automated process is controlled by run rules. Run rules are a set of table driven parameters that vary with the particular implementation and product being manufactured.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for allocating materials to an automated purchase assembly conversion process to support a dynamic configure-to-order production operation, the computer implemented method comprising:

analyzing, by a processor, a configure-to-order backlog order to determine demand for a particular purchase assembly;

identifying, by the processor, whether the demand for the particular purchase assembly can be filled with an on-hand purchase assembly in inventory;

responsive to identifying that the demand for the particular purchase assembly can be filled with an on-hand purchase assembly in inventory, allocating, by the processor, the on-hand purchase assembly in inventory to fill the demand;

responsive to identifying that the demand for the particular purchase assembly can not be filled with an on-hand purchase assembly in inventory identifying, by the processor, whether the on-hand purchase assembly in inventory and the particular purchase assembly are of a same conversion family, wherein the same conversion family is a group of related data processing systems schematics containing hardware parts common to each member of the conversion family;

responsive to identifying that the on-hand purchase assembly in inventory and the particular purchase assembly are of a same conversion family, identifying, by the processor, whether parts from an other on-hand purchase assembly in inventory and the on-hand individual parts can be reallocated to the on-hand purchase assembly to fill a bill of materials for the particular purchase assembly;

identifying, by the processor, a conversion priority for the on-hand purchase assembly and a conversion priority for other on-hand purchase assemblies of the same conversion family; responsive to identifying that the conversion priority for the on-hand purchase assembly is a higher conversion priority than the conversion priority for other on-hand purchase assemblies of the same conversion family, preferentially allocating, by the processor, the on-hand purchase assembly to fill the demand for the particular purchase assembly over the other on-hand purchase assemblies of the same conversion family; and responsive to identifying that the demand for the particular purchase assembly can be filled by reallocating the on-hand purchase assembly in inventory and on-hand individual parts, reallocating, by the processor, the on-hand purchase assembly in inventory and the on-hand individual parts to fill the demand.

2. The computer implemented method of claim 1, wherein the computer implemented step of reallocating the on-hand purchase assembly in inventory and the on-hand individual parts to fill the demand further comprises:

responsive to identifying whether the on-hand purchase assembly in inventory and the particular purchase assembly are of a same conversion family, and responsive to identifying whether parts from an other on-hand purchase assembly in inventory and the on-hand individual parts can be reallocated to fill a bill of materials for the particular purchase assembly, reallocating, by the processor, the on-hand purchase assembly, the parts from the other on-hand purchase assembly in inventory and the on-hand individual parts for converting the on-hand purchase assembly to the particular purchase assembly.

3. The computer implemented method of claim 2, further comprising the computer implemented step of:

responsive to reallocating the on-hand purchase assembly, the parts from the other on-hand purchase assembly in inventory and the on-hand individual parts for converting the on-hand purchase assembly to the particular purchase assembly, adjusting, by the processor, inventory to include any leftover parts from the other on-hand purchase assembly in inventory that were not reallocated for converting the on-hand purchase assembly to the particular purchase assembly.

4. The computer implemented method of claim 1, further comprising the computer implemented step of:

responsive to identifying either that the on-hand purchase assembly in inventory and the particular purchase assembly are not of a same conversion family or that the parts from the other on-hand purchase assembly in inventory and the on-hand individual parts can not be reallocated to fill a bill of materials for the particular purchase assembly, delaying, by the processor, filling of the demand; and responsive to identifying either that the on-hand purchase assembly in inventory and the particular purchase assembly are not of a same conversion family or that the parts from the other on-hand purchase assembly in inventory and the on-hand individual parts can not be reallocated to fill a bill of materials for the particular purchase assembly, retaining, by the processor, the demand for a particular purchase assembly in the configure-to-order backlog order.

5. The computer implemented method of claim 1, wherein the step of analyzing a configure-to-order backlog order to determine demand for a particular purchase assembly further comprises:

analyzing, by the processor, a configure-to-order backlog order according to a set of run rules to determine demand for a particular purchase assembly, wherein the run rules provide times at which the configure-to-order backlog order should be compared to the inventory.

6. The computer implemented method of claim 1, further comprising:

responsive to reallocating the on-hand purchase assembly in inventory and the on-hand individual parts to fill the demand, generating, by the processor, an automatic manufacturing work order for converting the on-hand purchase assembly to the particular purchase assembly, wherein the automatic manufacturing work order includes a part number for the on-hand purchase assembly, the parts from the other on-hand purchase assembly in inventory and the on-hand individual parts that are to be used for converting the on-hand purchase assembly to the particular purchase assembly.

7. A tangible computer usable medium having a computer usable program encoded thereon, the computer program product configured for allocating materials to an automated purchase assembly conversion process to support a dynamic configure-to-order production operation, wherein the tangible computer usable medium comprises:

computer usable program code for analyzing a configure-to-order backlog order to determine demand for a particular purchase assembly;

computer usable program code for identifying whether the demand for the particular purchase assembly can be filled with an on-hand purchase assembly in inventory;

computer usable program code, responsive to identifying that the demand for the particular purchase assembly can be filled with an on-hand purchase assembly in inventory, for allocating the on-hand purchase assembly in inventory to fill the demand;

computer usable program code, responsive to identifying that the demand for the particular purchase assembly can not be filled with an on-hand purchase assembly in inventory, for identifying whether the on-hand purchase assembly in inventory and the particular purchase assembly are of a same conversion family, wherein the same conversion family is a group of related data processing systems schematics containing hardware parts common to each member of the conversion family;

computer usable program code, responsive to identifying that the on-hand purchase assembly in inventory and the particular purchase assembly are of a same conversion family, for identifying whether parts from an other on-hand purchase assembly in inventory and the on-hand individual parts can be reallocated to the on-hand purchase assembly to fill a bill of materials for the particular purchase assembly;

computer usable program code for identifying a conversion priority for the on-hand purchase assembly and a conversion priority for other on-hand purchase assemblies of the same conversion family;

computer usable program code, responsive to identifying that the conversion priority for the on-hand purchase assembly is a higher conversion priority than the conversion priority for other on-hand purchase assemblies of the same conversion family, for preferentially allocating the on-hand purchase assembly to fill the demand for the particular purchase assembly over the other on-hand purchase assemblies of the same conversion family; and computer usable program code, responsive to identifying that the demand for the particular purchase assembly can be filled by reallocating the on-hand purchase assembly in inventory and on-hand individual parts, for reallocating the on-hand purchase assembly in inventory and the on-hand individual parts to fill the demand.

8. The tangible computer usable medium of claim 7, wherein the computer usable program code for reallocating the on-hand purchase assembly in inventory and the on-hand individual parts to fill the demand further comprises:

computer usable program code, responsive to identifying whether the on-hand purchase assembly in inventory and the particular purchase assembly are of a same conversion family, and responsive to identifying whether parts from an other on-hand purchase assembly in inventory and the on-hand individual parts can be reallocated to fill a bill of materials for the particular purchase assembly, for reallocating the on-hand purchase assembly, the parts from the other on-hand purchase assembly in inventory and the on-hand individual parts for converting the on-hand purchase assembly to the particular purchase assembly.

9. The tangible computer usable medium of claim 8, further comprising the computer implemented step of:

computer usable program code, responsive to reallocating the on-hand purchase assembly, the parts from the other on-hand purchase assembly in inventory and the on-hand individual parts for converting the on-hand purchase assembly to the particular purchase assembly, for adjusting inventory to include any leftover parts from the other on-hand purchase assembly in inventory that were not reallocated for converting the on-hand purchase assembly to the particular purchase assembly.

10. The tangible computer usable medium of claim 7, further comprising:

computer usable program code, responsive to identifying either that the on-hand purchase assembly in inventory and the particular purchase assembly are not of a same conversion family or that the parts from the other on-hand purchase assembly in inventory and the on-hand individual parts can not be reallocated to fill a bill of materials for the particular purchase assembly, for delaying filling of the demand; and computer usable program code, responsive to identifying either that the on-hand purchase assembly in inventory and the particular purchase assembly are not of a same conversion family or that the parts from the other on-hand purchase assembly in inventory and the on-hand individual parts can not be reallocated to fill a bill of materials for the particular purchase assembly, for retaining the demand for a particular purchase assembly in the configure-to-order backlog order.

11. The tangible computer usable medium of claim 7, wherein the computer usable program code for analyzing a configure-to-order backlog order to determine demand for a particular purchase assembly further comprises:

computer usable program code for analyzing a configure-to-order backlog order according to a set of run rules to determine demand for a particular purchase assembly, wherein the run rules provide times at which the configure-to-order backlog order should be compared to the inventory.

12. The tangible computer usable medium of claim 7, further comprising:

computer usable program code, responsive to reallocating the on-hand purchase assembly in inventory and the on-hand individual parts to fill the demand, for generating an automatic manufacturing work order for converting the on-hand purchase assembly to the particular purchase assembly, wherein the automatic manufacturing work order includes a part number for the on-hand purchase assembly, the parts from the other on-hand purchase assembly in inventory and the on-hand individual parts that are to be used for converting the on-hand purchase assembly to the particular purchase assembly.

13. A data processing system comprising:

a processor;

a storage unit having computer usable instructions for allocating materials to an automated purchase assembly conversion process to support a dynamic configure-to-order production operation; and a bus system connecting the processor to the storage unit; wherein the processor executes the computer usable instructions to analyze a configure-to-order backlog order to determine demand for a particular purchase assembly; to identify whether the demand for the particular purchase assembly can be filled with an on-hand purchase assembly in inventory; responsive to identifying that the demand for the particular purchase assembly can be filled with an on-hand purchase assembly in inventory, to allocate the on-hand purchase assembly in inventory to fill the demand; responsive to identifying that the demand for the particular purchase assembly can not be filled with an on-hand purchase assembly in inventory, to identify whether the on-hand purchase assembly in inventory and the particular purchase assembly are of a same conversion family, wherein the same conversion family is a group of related data processing systems schematics containing hardware parts common to each member of the conversion family; responsive to identifying that the on-hand purchase assembly in inventory and the particular purchase assembly are of a same conversion family, to identify whether parts from an other on-hand purchase assembly in inventory and the on-hand individual parts can be reallocated to the on-hand purchase assembly to fill a bill of materials for the particular purchase assembly; to identify a conversion priority for the on-hand purchase assembly and a conversion priority for other on-hand purchase assemblies of the same conversion family; responsive to identifying that the conversion priority for the on-hand purchase assembly is a higher conversion priority than the conversion priority for other on-hand purchase assemblies of the same conversion family, to preferentially allocate the on-hand purchase assembly to fill the demand for the particular purchase assembly over the other on-hand purchase assemblies of the same conversion family; and responsive to identifying that the demand for the particular purchase assembly can be filled by reallocating the on-hand purchase assembly in inventory and on-hand individual parts, to reallocate the on-hand purchase assembly in inventory and the on-hand individual parts to fill the demand.

14. The data processing system of claim 13, wherein the processor executing the computer usable instructions to reallocate the on-hand purchase assembly in inventory and the on-hand individual parts to fill the demand further comprises the processor executing the computer usable instructions:

responsive to identifying whether the on-hand purchase assembly in inventory and the particular purchase assembly are of a same conversion family, and responsive to identifying whether parts from an other on-hand purchase assembly in inventory and the on-hand individual parts can be reallocated to fill a bill of materials for the particular purchase assembly, to reallocate the on-hand purchase assembly, the parts from the other on-hand purchase assembly in inventory and the on-hand individual parts for converting the on-hand purchase assembly to the particular purchase assembly.

15. The data processing system of claim 14, wherein the processor further executes the computer usable instructions:

responsive to reallocating the on-hand purchase assembly, the parts from the other on-hand purchase assembly in inventory and the on-hand individual parts for converting the on-hand purchase assembly to the particular purchase assembly, to adjust inventory to include any leftover parts from the other on-hand purchase assembly in inventory that were not reallocated for converting the on-hand purchase assembly to the particular purchase assembly.

16. The data processing system of claim 13, wherein the processor further executes the computer usable instructions:

responsive to identifying either that the on-hand purchase assembly in inventory and the particular purchase assembly are not of a same conversion family or that the parts from the other on-hand purchase assembly in inventory and the on-hand individual parts can not be reallocated to fill a bill of materials for the particular purchase assembly, to delay filling of the demand; and responsive to identifying either that the on-hand purchase assembly in inventory and the particular purchase assembly are not of a same conversion family or that the parts from the other on-hand purchase assembly in inventory and the on-hand individual parts can not be reallocated to fill a bill of materials for the particular purchase assembly, to retain the demand for a particular purchase assembly in the configure-to-order backlog order.

17. The data processing system of claim 13, wherein the processor further executes the computer usable instructions:

responsive to reallocating the on-hand purchase assembly in inventory and the on-hand individual parts to fill the demand, to generate an automatic manufacturing work order for converting the on-hand purchase assembly to the particular purchase assembly, wherein the automatic manufacturing work order includes a part number for the on-hand purchase assembly, the parts from the other on-hand purchase assembly in inventory and the on-hand individual parts that are to be used for converting the on-hand purchase assembly to the particular purchase assembly.

* * * * *